(12) United States Patent
Sorensen et al.

(10) Patent No.: US 7,856,699 B2
(45) Date of Patent: Dec. 28, 2010

(54) TIE-DOWN AND TENSIONING SYSTEM

(75) Inventors: Joseph Sorensen, San Simeon, CA (US); Richard N. Case, Boulder, CO (US); Bowden Ormsbee, Longmont, CO (US)

(73) Assignee: Nite Ize, Inc., Boulder, CO (US)

( * ) Notice: Subject to any disclaimer, the term of this patent is extended or adjusted under 35 U.S.C. 154(b) by 904 days.

(21) Appl. No.: 11/799,884

(22) Filed: May 2, 2007

(65) Prior Publication Data

US 2007/0209165 A1   Sep. 13, 2007

Related U.S. Application Data

(63) Continuation-in-part of application No. 11/050,274, filed on Feb. 3, 2005, now Pat. No. 7,636,986.

(51) Int. Cl.
*F16G 11/04* (2006.01)
*F16G 11/00* (2006.01)

(52) U.S. Cl. ............ 24/130; 24/129 R; 24/129 A; 24/68 F; 24/71.1; D8/382; D8/356

(58) Field of Classification Search ............ 24/130, 24/115 H, 115 R, 129 A, 68 F, 71.1, 129 R; D8/382, 356; 114/218; 410/69–100; 242/388.2
See application file for complete search history.

(56) References Cited

U.S. PATENT DOCUMENTS

| | | | |
|---|---|---|---|
| 555,340 A | 2/1896 | Schwarzmann | |
| 656,431 A | 8/1900 | Stewart | |
| 703,018 A | 6/1902 | Thomas | |
| RE12,147 E | * 8/1903 | Priddat | 24/130 |
| 1,322,410 A | 11/1919 | Connelly | |
| 2,536,159 A | * 1/1951 | Darkins | 24/130 |
| 3,398,714 A | 8/1968 | Wallin et al. | |
| 4,144,620 A | 3/1979 | Schaeffer | |
| 4,377,886 A | 3/1983 | Golden | |
| 4,719,668 A | 1/1988 | Cavanagh | |
| 4,828,210 A | 5/1989 | Anderson et al. | |
| 5,205,687 A | 4/1993 | Boyland | |
| 5,230,295 A | 7/1993 | Shell | |
| 5,307,751 A | 5/1994 | Shell | |
| 5,351,367 A | 10/1994 | Kennedy et al. | |
| 5,363,975 A | 11/1994 | Meade | |

(Continued)

FOREIGN PATENT DOCUMENTS

FR   2733013   10/1996

*Primary Examiner*—Robert J Sandy
(74) *Attorney, Agent, or Firm*—Patton Boggs LLP

(57) ABSTRACT

A tie-down and tensioning device including: a device body; an attachment member connected to the device body, the attachment member including an attachment opening; a cord block comprising a cord block hook connected to the device body, and a cord support surface disposed between the cord block hook and the device body; and a cord gripper attached to the device body, the cord gripper comprising a cord gripper hook connected to the device body, the interior surface of the cord gripper hook and the surface of the device body opposing the interior surface of the cord gripper hook defining a wedge-shaped opening, and a cord gripping surface formed on one of the interior surface of the cord gripper hook and the opposing surface of the device body.

14 Claims, 11 Drawing Sheets

U.S. PATENT DOCUMENTS

| | | |
|---|---|---|
| 5,519,921 A | 5/1996 | Templer, Jr. |
| 5,625,925 A * | 5/1997 | Richards .................. 24/129 R |
| 5,784,763 A | 7/1998 | Cassidy |
| 5,813,790 A | 9/1998 | Goran, Jr. |
| 6,317,935 B1 | 11/2001 | O'Rouke et al. |
| 6,662,739 B1 | 12/2003 | Radford |
| 2005/0061905 A1 | 3/2005 | Sherman et al. |
| 2006/0168772 A1 | 8/2006 | Sorensen |
| 2006/0179618 A1 | 8/2006 | Radford |

* cited by examiner

SECTION A-A

SECTION B-B

TIE-DOWN AND TENSIONING SYSTEM

CROSS-REFERENCE TO RELATED APPLICATIONS

This Application is a Continuation-In-Part of U.S. application Ser. No. 11/050,274 filed on Feb. 3, 2005.

FIELD OF THE INVENTION

The present invention relates to a tie-down and tensioning system, and in particular to such a system that does not require knots, buckles or other similar connecting parts that take time to utilize, and methods of using the tensioning system.

BACKGROUND OF THE INVENTION

Ropes are often used to tie down loads, such as a tarp over a pickup truck bed. Ropes are also used to secure items, such as a tent to a stake. Often, it is difficult to get sufficient tension in the rope when simply tying it to a tie-down point. At other times, it is important to be able to tie an object down quickly, such as when there is imminent danger of capsizing or many ropes must be secured in a short time. Further, when conditions are adverse, such as poor light conditions or in cold weather that requires gloves, or just when hands are cold, it is often difficult to tie down items or properly tension the tie-down. Therefore, it would be useful to have a device that is capable of assisting in tying down and tensioning a rope. There are many rope tie downs and tensioning devices currently available. However, existing devices have drawbacks, including having complicated parts, being too expensive, requiring knots to be tied, or being difficult, time consuming, or complicated to use, particularly in adverse conditions.

BRIEF SUMMARY OF THE INVENTION

The invention solves the above and other problems by providing a tie-down and tensioning system that includes a tie-down and tensioning device comprising an attachment member, a cord block, and a cord gripper all connected by and integrally formed with a tie-down tensioner device body. The cord gripper preferably is a wedge-shaped opening having a serrated edge that grips the cord. A cord can be quickly attached to the tie-down and tensioning device by wrapping it about the cord block and then slipping it into the cord gripper. The attachment member can take many forms, including a carabiner, a cord attachment and a cord, a flange with fastener holes, a grommet attached to a fabric connector, and many others.

The invention provides a tie-down and tensioning system comprising a tie-down and tensioning device comprising: a device body, an attachment member connected to the device body, the attachment member including an attachment opening; a cord block comprising: a cord block hook connected to the device body and a cord support surface disposed between the cord block hook and the device body; a cord gripper attached to the device body, the cord gripper comprising: a cord gripper hook connected to the device body, the interior surface of the cord gripper hook and the surface of the device body opposing the interior surface of the cord gripper hook defining a wedge-shaped opening, and a cord gripping surface formed on one of the interior surface of the cord gripper hook and the opposing surface of the device body. Preferably, the attachment member opening comprises an elongated slot, the slot being substantially in a direction parallel to the direction of the cord gripping surface, and wherein the end of the slot nearest the cord block is substantially wedge-shaped. Preferably, the attachment member includes a carabiner having a carabiner body, a carabiner slot, and a carabiner gate for closing the slot. Preferably, the carabiner gate comprises a spring clip. Preferably, the carabiner gate comprises a twist screw gate. Preferably, the attachment member comprises a grommet. Preferably, the attachment member further comprises a fabric connector with the grommet attached to the fabric connector. Preferably, the attachment member further comprises a bracket having a bracket arm, and the fabric connector is connected to the bracket arm. Preferably, the attachment member comprises a flange and the opening comprises a fastener hole in the flange. Preferably, the attachment member comprises a cord. Preferably, the attachment member further comprises a cord attachment member, at least a portion of which is integrally formed with the device body. Preferably, the cord attachment member includes a cord receptacle cover covering the cord receptacle. Preferably, the system further includes a pin connected to the device body and passing through the cord. Preferably, the system further includes glue attaching the receptacle to the cord. Preferably, the system further includes a cord packaged with the tie-down and tensioning device, the cord connected to the device in a manner in which it is to be used.

The invention also provides a method of tying down an object with a cord and tensioning the cord, the method comprising: providing a tie-down and tensioning device comprising an attachment member, a cord block, and a cord gripper, the attachment member, cord block, and cord gripper connected by and integrally formed with a device body; attaching the attachment member to an object; looping a cord about the cord block; applying sufficient tension to the cord to tighten the cord about the cord block to create friction between the cord block and the cord; and inserting the cord into the cord gripper. Preferably, the attaching comprises attaching a carabiner. Preferably, the attaching comprises attaching to a grommet. Preferably, the attachment member comprises the cord. Preferably, the cord gripper includes a wedge opening having a serrated surface with the serrations pointing toward the bottom of the wedge, and the inserting comprises inserting the cord into the wedge opening so that the serrations grip the cord.

The tie-down tensioner system can be quickly used to tie down and tension a cord, even in adverse conditions, since no knots or other similarly complex apparatus are required to secure and tension the cord. Further, the tension can be quickly adjusted without untying and retying a knot. The foregoing paragraphs have been provided by way of general introduction, and are not intended to limit the scope of the following claims. The presently preferred embodiments, together with further advantages, will be best understood by reference to the following detailed description taken in conjunction with the accompanying drawings.

DETAILED DESCRIPTION OF THE INVENTION

Figure 1:
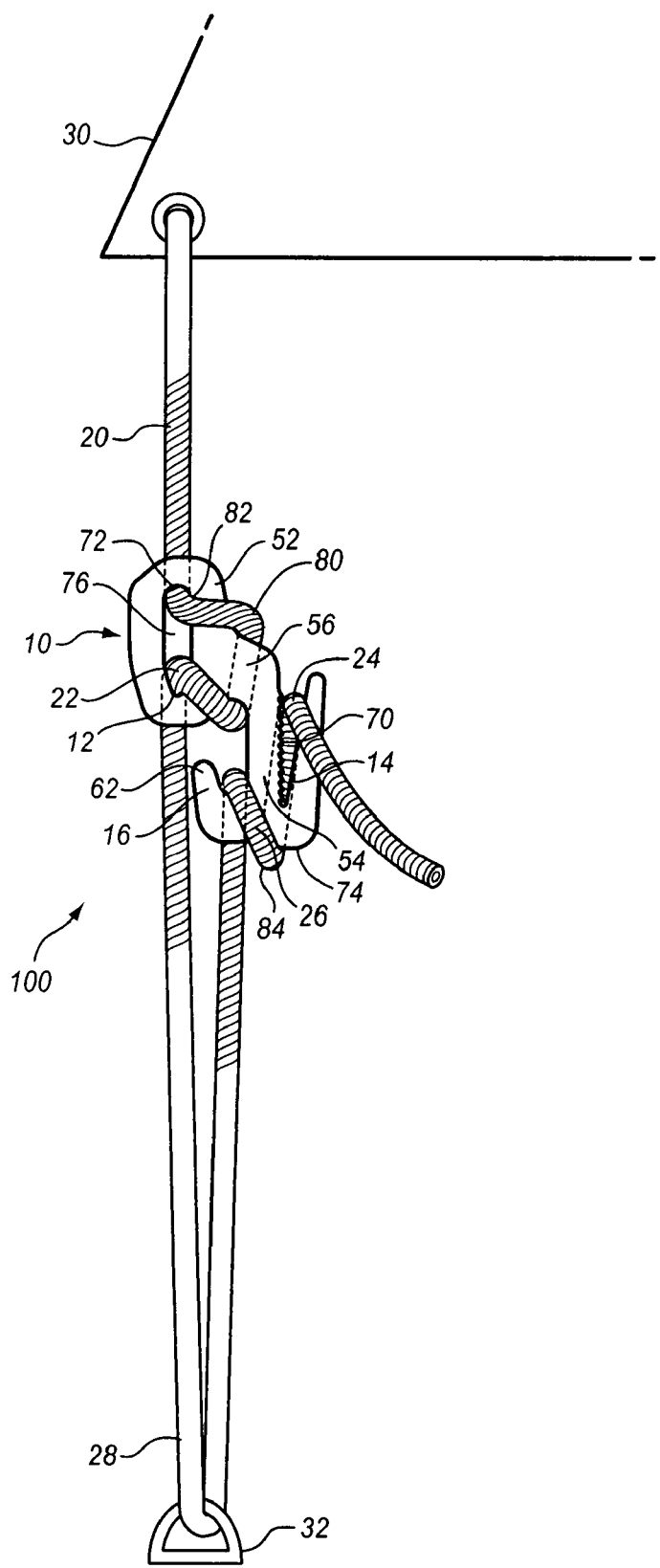
FIG. 1 shows one embodiment of a tie-down and tensioning system according to the invention and illustrates its method of use.

The invention is described with reference to the drawings. The relationship and functioning of the various elements of this invention are better understood by the following detailed description. However, the embodiments of this invention as described below are by way of example only, and the invention is not limited to the embodiments illustrated in the drawings.

The invention provides a tie-down and tensioning device for adjusting the tension on a piece of cord. The term "cord" as used herein includes any type of elongated, relatively flexible object that can be used to secure an object, including without limitation ropes, straps, thread, yarn, wires, webs, twine, and fibers, whether circular, oval, flat, rectangular, or any other shape in cross-section. The tensioning is generally incorporated into a tie-down.

An embodiment of the tie-down and tensioning system 100 comprises a tie-down and tensioning device 10 attached to a piece of cord 20 is shown in FIG. 1. Device 10 has a first wedge opening 12. One end of cord 20 is attached to the object being secured, such as a portion of a tarp 30. A first portion 22 of cord is releasably secured in first wedge opening 12. A portion 28 of cord passes through a tie-down point 32, which could be, for example, a bracket or a stake in the ground. Device 10 has a second wedge opening 14. A second portion 24 of cord is secured in second wedge opening 14. Another portion 26 of cord between tie-down point 32 and second portion 24 of cord may be looped around a cord block 16. The term "cord block" as used herein means a member, or portion thereof, over or about which the cord passes and can move over easily when the cord is loose, but when tension is applied to the cord, the cord tightens and creates friction which assists in the cord remaining secure to the device, and is not limited to any particular shape or material. Sometimes, because of the friction function when the cord is tight, the cord block may be termed a "cord friction block".

One embodiment of a tie-down and tensioning system 100 including a tie-down and tensioning device 10 and a cord 20 is shown in FIGS. 1 through. 4. Device 10 may be constructed of any suitable material, including plastic, metal, or wood. Device 10 comprises an attachment member 52, a cord friction block 16, and a cord gripper 53 interconnected by a device body 54 which includes a neck 56. Attachment member 52 includes a pair of opposing first surfaces 42, 44 defining a first wedge opening 12. First surfaces 42, 44 are fixed relative to each other. First wedge opening 12 is shaped to releasably secure a first portion 22 of cord. A pair of opposing second surfaces 46, 48 defines a second wedge opening 14. First and second surfaces 46, 48 are fixed relative to each other. Second wedge opening 14 is spaced apart from first wedge opening 12. Second wedge opening 14 is shaped to releasably secure a second portion of cord. Cord block 16 defines a support surface 50 spaced from first and second wedge openings 12, 14. Support surface 50 is positioned to slidably support the cord between first and second wedge openings 12, 14.

Figure 2:
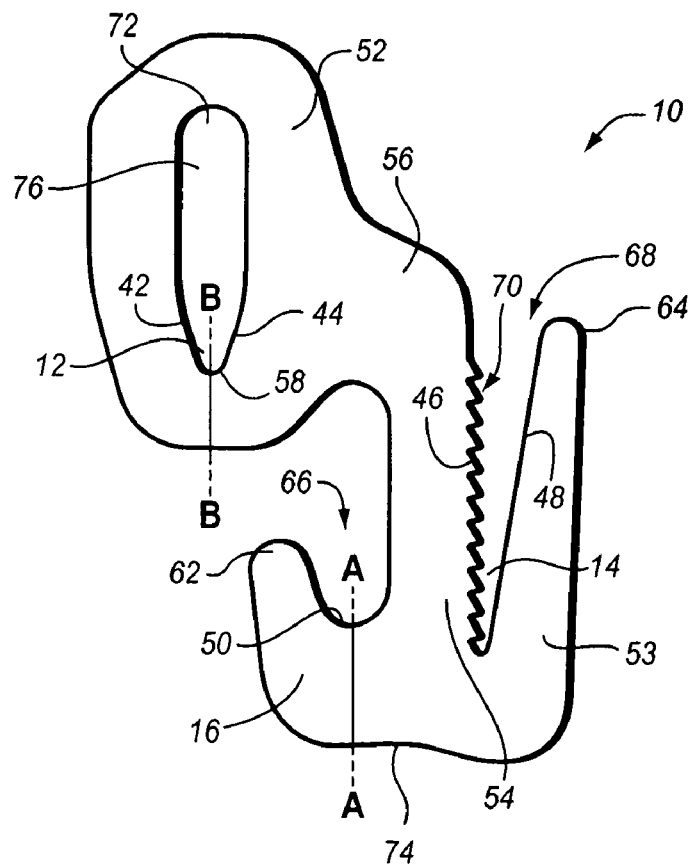
FIG. 2 shows a plan view of the tie-down and tensioning device of the system of FIG. 1.
Figure 2A:
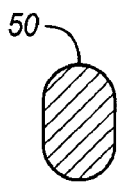
FIG. 2A is a cross-sectional view of the device of FIG. 2 taken through the line A-A of FIG. 2.
Figure 2B:
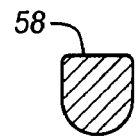
FIG. 2B is a cross-sectional view of the device of FIG. 2 taken through the line B-B of FIG. 2.

A cross-section along line A-A of tie-down and tensioning device 10 adjacent second wedge opening 14 is shown in FIG. 2A. A cross-section along line B-B of device 10 adjacent first wedge opening 12 is shown in FIG. 2B. In one embodiment, the maximum preferred radius of curvature of cord block 16 across cross-section A-A is equal to half the thickness of device 10 (i.e., support surface 50 has a semicircular cross-section). This shape allows the cord to slide freely. In one embodiment, surface 58 of wedge opening 12 is generally flat across cross-section B-B to provide the maximum gripping surface for the cord. In one embodiment, device 10 has a relatively thin cross-section. In one embodiment, device 10 is between about 0.2 and about 0.5 inches thick. However, device 10 may be less than 0.2 inches and greater than 0.5 inches.

In one embodiment, tie-down and tensioning device 10 includes a first body portion comprising cord attachment member 52, a second body portion comprising a device interconnecting device body 54 interconnecting a cord gripper 53, and cord block 16, interconnecting the device body portions. Interconnecting device body 54 includes a neck portion 56. Interconnecting device body 54 connects attachment member 52, cord gripper 53, and cord block 16. The attachment member of first body portion 52 defines a first wedge opening 12, and second body portion 54 defines a second wedge opening 14. The neck portion 56 is adapted to support the cord between first and second wedge openings 12, 14. Neck portion 56 and opening 76 allows device 10 to attach to a piece of cord without untying the cord or having to tie the cord to device 10. In one embodiment, the length of neck portion 56 along the direction connecting body portion 52 to body portion 54 is shorter than one dimension of first body portion 52 in a direction into the paper in FIGS. 1, 2, and 3 so as to provide a surface to support a loop of the cord around neck portion 56. In one embodiment, interconnecting body portion 54 further defines one side of cord block 16 and gripper 53.

In one embodiment, cord block 16 includes a first hook 62. First hook 62 is disposed laterally from device body 54 and extends towards, and defines an opening facing, attachment member 52. First hook 62 allows the cord to slide along support surface 50 but limits lateral movement, that is, movement in a direction perpendicular to the direction along cord portions 20 and 28 when tension is applied to the cord. In one embodiment, second wedge opening 14 is defined by a second hook 64 with interior surface 48. In one embodiment, second wedge opening 14 is generally V-shaped, with second hook 64, particularly second surface 48, tapering away from device body 54. Second wedge opening 14 is adapted to secure a portion of cord between second hook 64 and device body 54. In one embodiment, first and second hooks 62, 64 are disposed on opposite sides of device body 54. In one embodiment, first and second hooks 62, 64 have first and second mouths 66, 68 opening in the same general direction.

In one embodiment, one or both of the opposing second surfaces of second wedge opening 14 has gripping members 70 formed thereon. Gripping members 70 may be any structure suitable for securing a cord between the second surfaces. In one embodiment, gripping members 70 are teeth or barbs, preferably forming a serrated surface 46, which is adapted to grip the cord. In one embodiment, the teeth are angled downwardly away from mouth 68 forming serrated surface 46.

In one embodiment, attachment member 52 includes a closed aperture 76 defined in part by first wedge opening 12 and further defined in part by a support surface 72 opposite first wedge opening 12. Support surface 72 is adapted to support a portion of cord. In one embodiment, support surface 72 has a semicircular shape, and first wedge opening 12 has a tapered shape. Closed aperture 76 is adapted to allow a loop 80 of cord to be inserted through aperture 76, passed over second body portion 54, and disposed around the neck of tie-down and tensioning device 10.

In one embodiment, cord block 16 includes a second support surface 74 formed at one end of device body 54 and facing a direction opposite the direction of the openings of first and second mouths 66, 68. Second support surface 74 is adapted to slidably support a portion of cord. In one embodiment, second support surface 74 is generally flat or slightly indented. However, second support surface 74 may have a more elaborate structure, such as a concave portion adapted to support the cord, similar to support surface 50 on cord block 16.

Referring to FIG. 1, a tie-down and tensioning system is shown. The tensioning system includes a cord 20 and tie-down and tensioning device 10. A first portion 22 of the cord is releasably secured in first wedge opening 12, and a second portion 24 of the cord is releasably secured in second wedge opening 14. A third portion 26 of the cord between the first and second portions is slidably supported by the support surface of cord block 16.

In one embodiment, the tensioning system includes a tie-down point 32 spaced from the device body, wherein a fourth portion 28 of the cord passes through tie-down point 32 between first wedge opening 12 and support surface 50 of cord block 16. It should be understood that the tie-down point is not necessarily a single point. For example, tie-down and tensioning device 10 may be used to secure a box to a push cart. A piece of cord is attached to the top of the cart and runs around the bottom of the box. Device 10 is secured to the portion of cord near the top of the cart. In this case, the tie-down point is not a single point but rather the bottom surface of the box. Further variations of the tie-down configuration are possible.

In one embodiment, the tensioning system includes a loop portion 80 of the cord disposed around neck portion 56. In one embodiment, a portion 82 of the cord is supported by second support surface 72 opposite first wedge opening 12. Thus, the cord is supported by support surface 72, loops around neck portion 56, and is secured in first wedge opening 12.

In one embodiment, a portion 84 of the cord between second and third portions 24, 26 of the cord is slidably supported by third support surface 74 of cord block 16. In one embodiment, first hook 62 helps to restrain or prevent the cord from moving off of cord block 16. In one embodiment, second portion 24 of the cord is releasably secured in second wedge opening 14 by gripping members 70. Gripping members 70 push against the surface of the cord to help secure it within second wedge opening 14.

Figure 3:
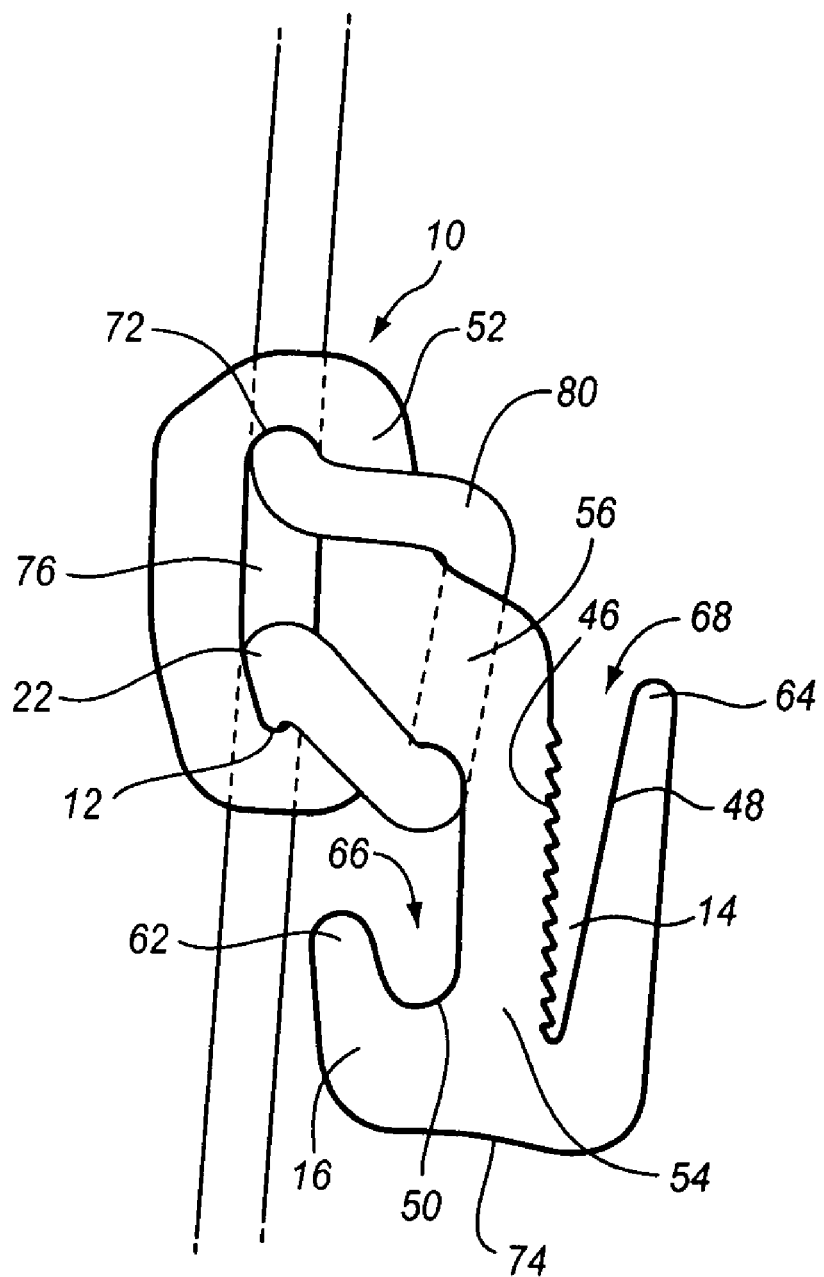
FIG. 3 illustrates a first portion of the method of using the system illustrated in FIG. 1.

In operation, as explained above, a first portion 22 of the cord is releasably secured in first wedge opening 12, as shown in FIG. 3. In one embodiment, the method of tensioning the cord further includes disposing a loop portion 80 of the cord around neck portion 56. This allows tie-down tensioning device 10 to be secured to the cord without the need either to untie the cord from its existing location or to tie the cord to device 10 itself. The position of device 10 on the cord can also be easily adjusted by moving a portion of the cord away from the first wedging surfaces or releasing it from first wedge opening 12 and then sliding device 10 along the cord as the cord slides along neck 56 and surface 72. In one embodiment, loop portion 80 of the cord is inserted through aperture 76, then passed over gripper 53, cord block 16, and device body 54, and then slipped about neck 56 with a portion of the cord supported by second support surface 72.

Figure 4:
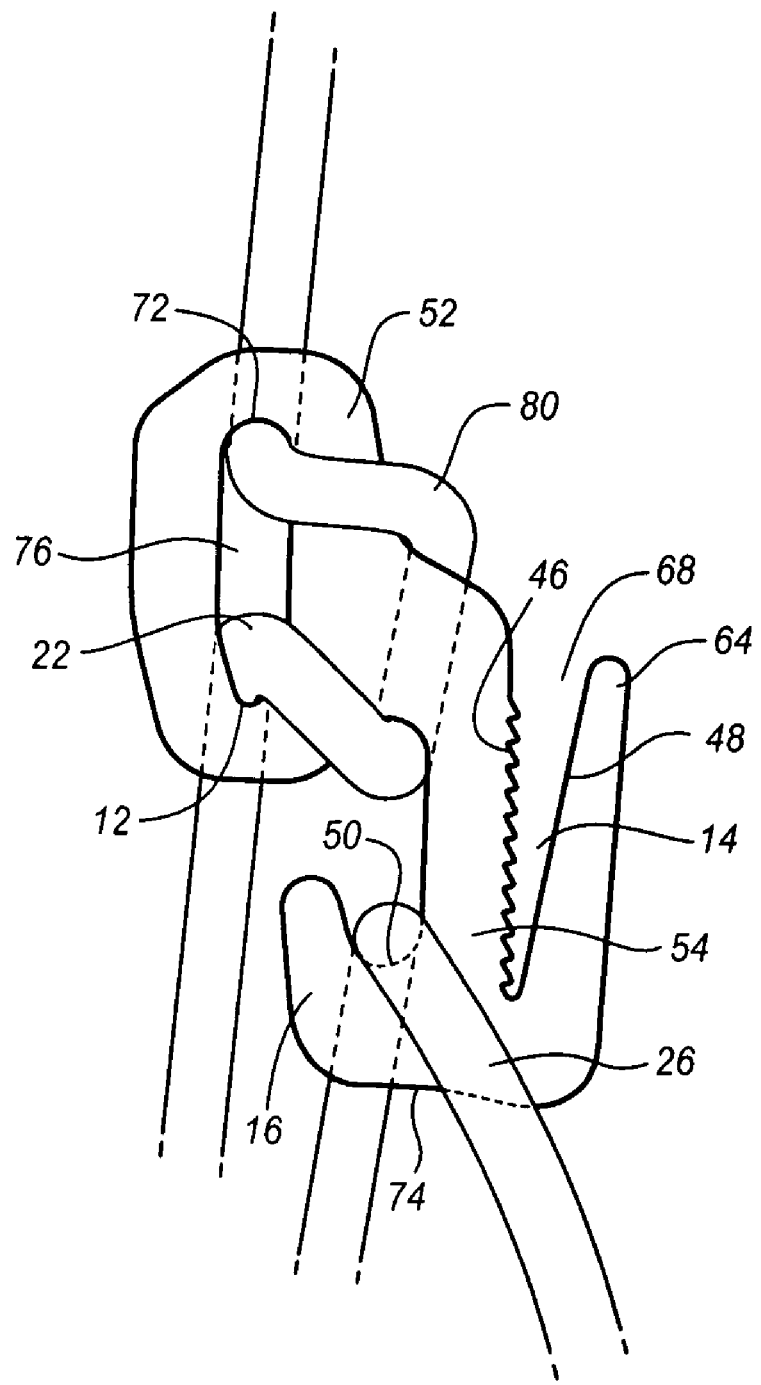
FIG. 4 shows another portion of the method of FIG. 1.

The cord then passes through a tie-down point 32. In one embodiment, the user pulls the cord tight and engages a portion 24 in wedge opening 14 between wedge surfaces 42, 44. Alternatively, the cord is tensioned by pulling on portion 26 of the cord to slide the cord on support surface 50 of cord block 16, as shown in FIG. 4. In this aspect, the system functions as a block and tackle, with the cord allowing a 2:1 mechanical advantage. Thus, less strength is required to reach a given tension that otherwise would be required without tie-down and tensioning device 10.

A second portion 24 of cord is then releasably secured in second wedge opening 14, with first and second portions 22, 24 of the cord positioned on opposite sides of tie-down point 32, as shown in FIG. 1. In one embodiment, the method further includes wrapping the cord around cord block 16 and supporting the cord on third support surface 74 on second body portion 54. In one embodiment, gripping members 70 push against second portion 24 of cord to help to secure it within second wedge opening 14. When tension is applied to cord 28, and gripping members do not allow portion 24 of the cord to move, the result is that cord portion 84 tightens around cord block 16 creating additional friction that secures the cord to second body portion 54.

In a further embodiment, a portion of the cord may be disposed through tie-down point 32 a second time after passing over cord block 16. Thus, the cord travels from tie-down and tensioning device 10 to a tie-down point 32, from tie-down point 32 to cord block 16, from cord block 16 back again to tie-down point 32, and then from tie-down point 32 to the user. This configuration creates a 4:1 mechanical advantage for the user pulling on the end of the cord, to allow even greater tensioning of the cord. After the cord is tensioned, portion 24 of the cord is engaged in wedge opening 14 between wedge surfaces 46, 48.

Figure 5:
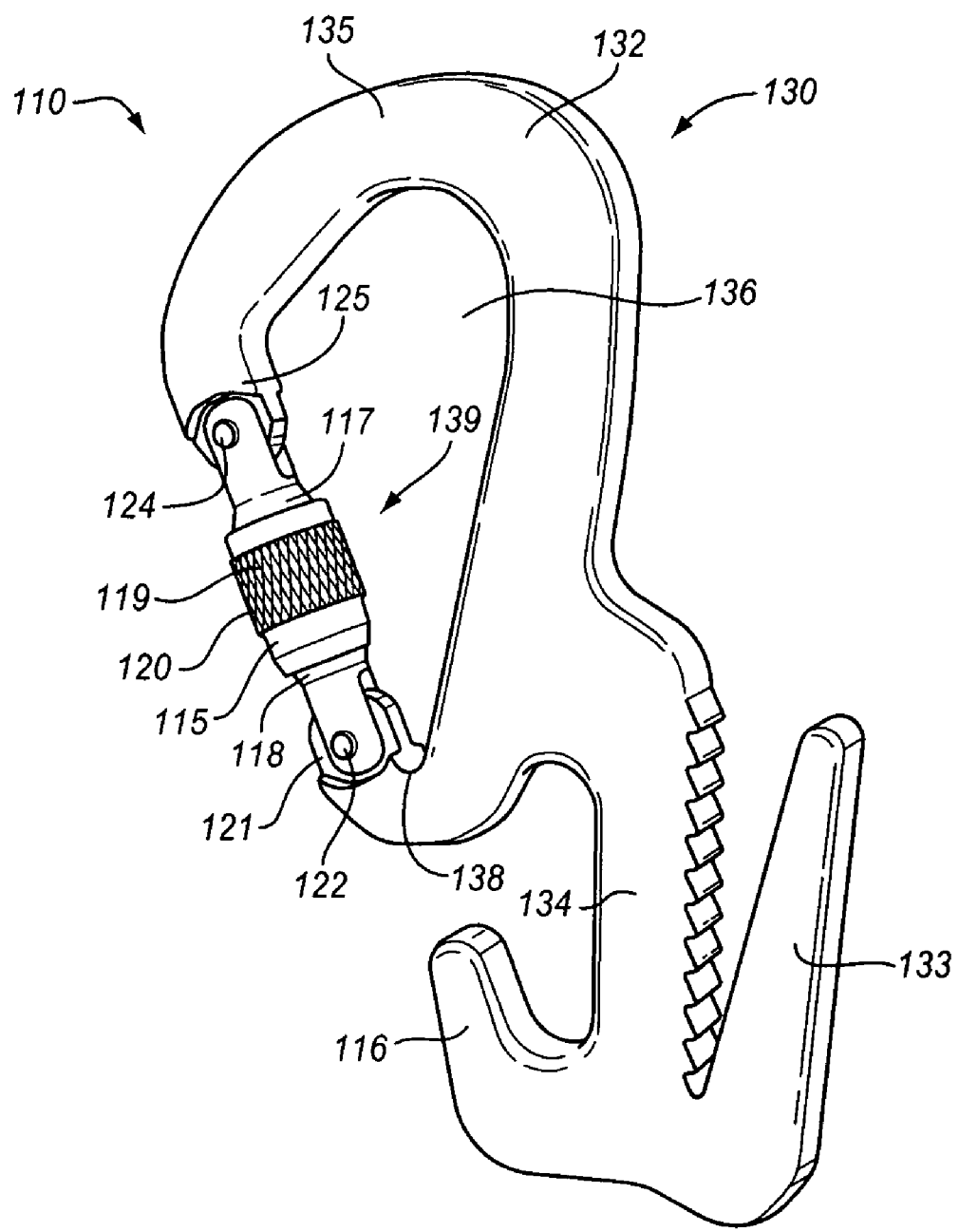
FIG. 5 shows an alternative embodiment of a tensioning system according to the invention incorporating a twist screw gate carabiner.

FIG. 5 shows an alternative embodiment of a tie-down and tensioning device 110 in which attachment member 132 comprises a carabiner 130 with a twist screw type gate 115. As known in the carabiner art, gate 115 comprises a first threaded gate member 117, a second threaded gate member 118, and a tubular nut 119 with a roughened surface 120. Carabiner body 135 is roughly C-shaped having a slot 139 passing through body 135 providing access to opening 136. Slot 139 is closed by gate 115. First gate member 117 is pivotably attached to one lip 125 of body 135 by pivot pin 124, and second gate member 118 is pivotably attached to the other lip 121 of carabiner body 155 by pivot pin 122. Attachment member opening 136 includes a wedge-shaped lower end 138. Device body 134, cord block 116, and gripper 133 are as described in the embodiment of FIGS. 1-4. Carabiner 130 allows device 110 to be attached to a rope or any other object which are attachable to carabiners.

Figure 6:
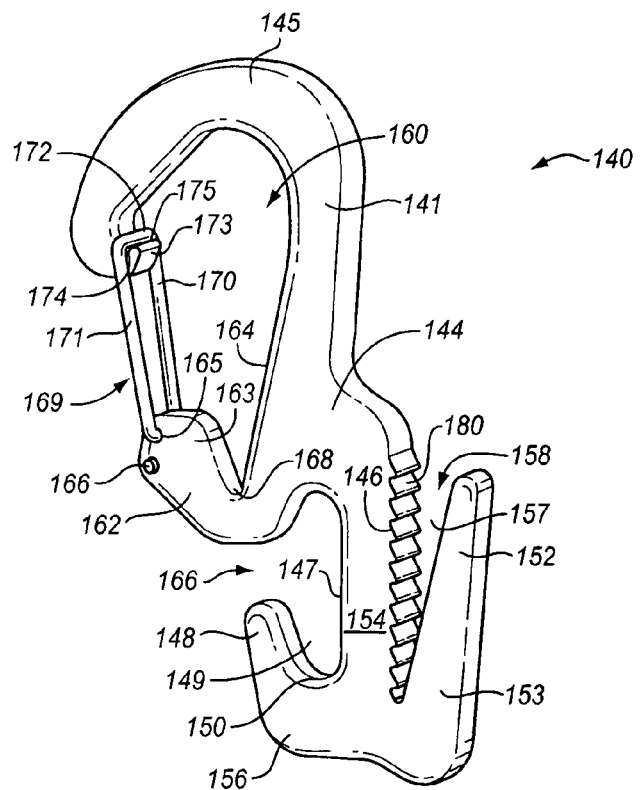
FIG. 6 shows an alternative embodiment of a tensioning system according to the invention incorporating a spring clip gate carabiner.

FIG. 6 shows another alternative embodiment 140 of a tie-down and tensioning device 110 according to the invention. Device 110 includes attachment member 141, device body 154 including neck 144, cord block 156, and cord gripper 153. Device body 154, cord block 156, and cord gripper 153 are similar to that in the foregoing embodiments. Cord block 156 includes a hook 148 and an opposing surface 147 forming a wedge opening 149 having a mouth 166 and a cord support surface 150. Gripper 153 includes a hook 152 and an opposing surface 146 forming a wedge opening 157 having a mouth 158. Surface 146 has serrations 180 to grip a cord. In this embodiment, attachment member 141 comprises a carabiner 140 having a carabiner body 145, a carabiner slot 169 passing through said carabiner body, and a carabiner gate 170 closing said carabiner slot. Carabiner gate comprises a wire or spring clip gate 170. Carabiner 140 includes a C-shaped circumferal body 145 having an opening 160 which can be accessed via slot 169. One side 174 of member 135 adjacent slot 169 has a lip 173 defining a groove 175. Spring clip gate 170 closes slot 169 in attachment member 141 which provides access to opening 160. Spring clip 170 comprises a wire loop 171, one end 165 of which pivots in lip 163 of C-shaped carabiner body member 145 and the other end 166 is fixed in lip 163 at a location further to the outside of carabiner body 145. This displacement provides a tension in wire loop 171 causing loop 171 to spring back to close the opening after being opened. Loop 171 is located and shaped so that the top 172 portion of loop 171 snaps over lip 173 into groove 175.

It should be understood that the tie-down and tensioning system according to the invention may include attachment members with other carabiner forms known in the art, with various gates, such as straight gate, bent gate, auto-locking gate and others, and with various shapes such as oval, D-shaped, offset-D, pear-shaped, and others.

Figure 7:
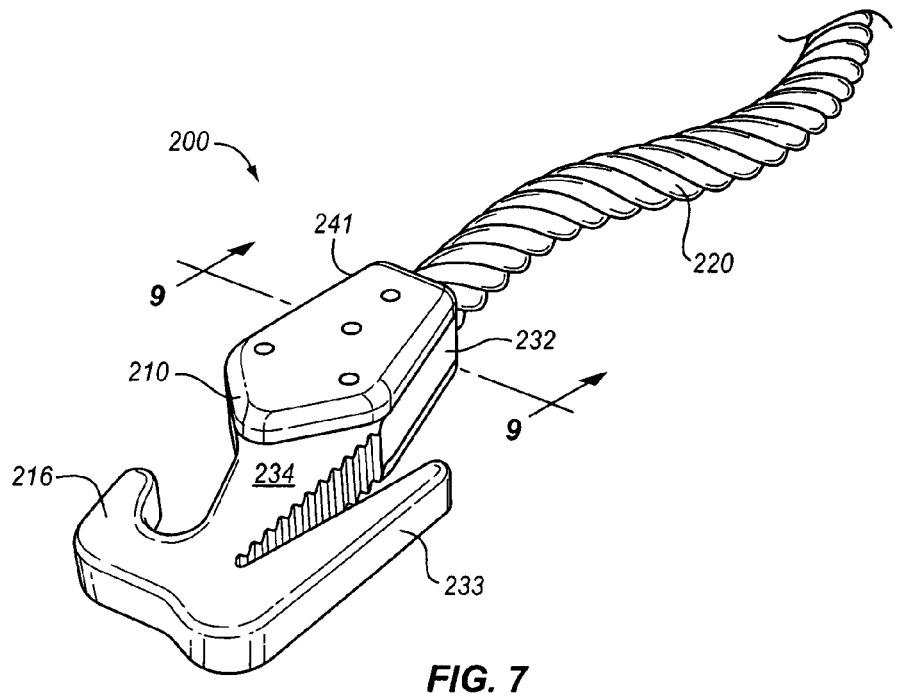
FIG. 7 shows an alternative embodiment of a tie-down and tensioning system according to the invention incorporating a tie-down and tensioning device with an integrated cord.
Figure 8:
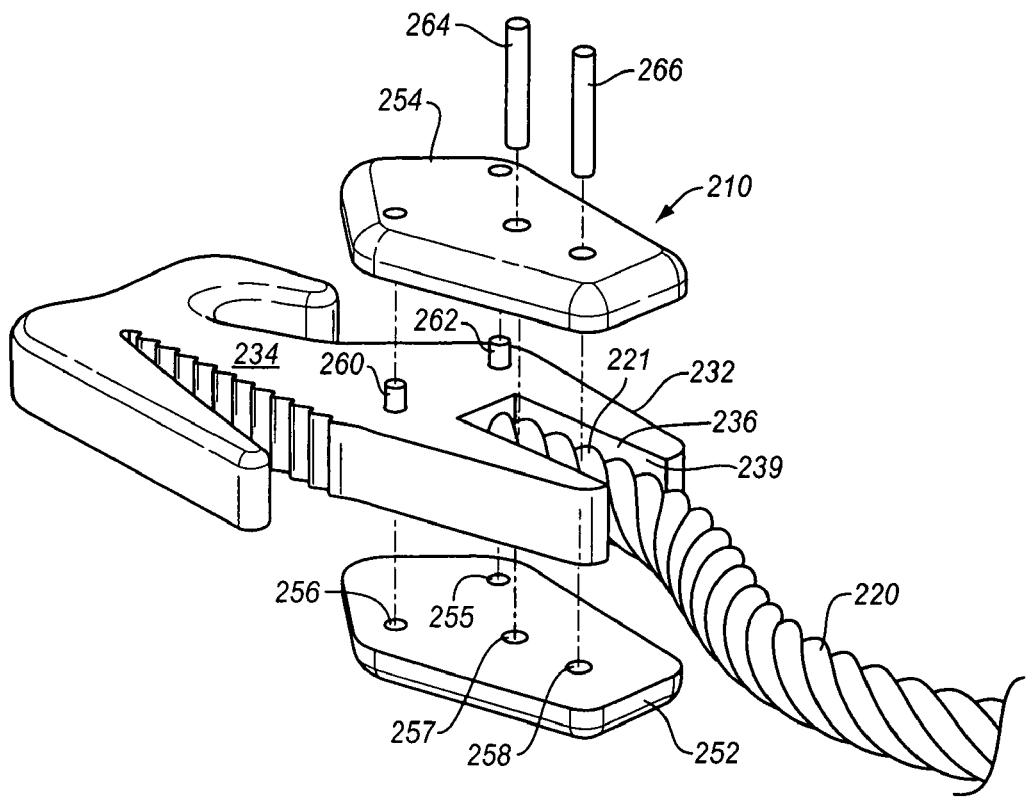
FIG. 8 is an exploded perspective view showing details of the integrated cord connector of FIG. 7.
Figure 9:
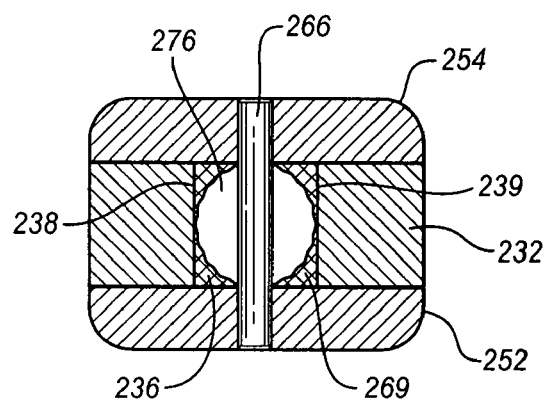
FIG. 9 shows a cross-sectional view of the integrated cord connector of FIG. 7 taken through line 9-9 of FIG. 7.

FIG. 7 is a perspective view of another embodiment of a tie-down and tensioning system 200 according to the invention. Tie-down and tensioning system 200 includes cord 220 and tie-down and tensioning device 210. Device 210 includes cord attachment member 241, device body 234, gripper 233, and cord block 216. Attachment member 241 comprises attachment member body 232, first plate 252, second plate 254, pins 260 and 261, and pins 264 and 266. Attachment member body 232 preferably is integrally formed with device body 234, and pins 260 and 261 preferably are integrally formed with first body member 232. Attachment member body 232 includes a receptacle 236 for the end 221 of cord 220 and at least one receptacle cover, 252 and 254, which comprise plates 252 and 254 in this embodiment. Plates 252 and 254 are identical, each having holes 255, 256, 257, and 258. Pins 260 and 262 are formed to enable a press fit into holes 255 and 256. Pins 264 and 266 pass through opening 257 and 258 in plate 254, pass through cord end 221, and press fit into holes 257 and 258 in plate 252. Since pins 264 and 266 are connected to plates 252 and 254, which in turn are connected to attachment member body 232, which is integrally formed with device body 234, these pins connect the cord to the device member body. A glue 269 fills the space between cord end 221, plates 252 and 254, and sides 238 and 259 of receptacle 236. Preferably, glue 269 is epoxy. The resulting structure leaves an opening 276 in attachment member 210 through which cord 220 passes. Cord block 216 and cord gripper 233 are identical to these parts in the previous embodiments.

Figure 10:
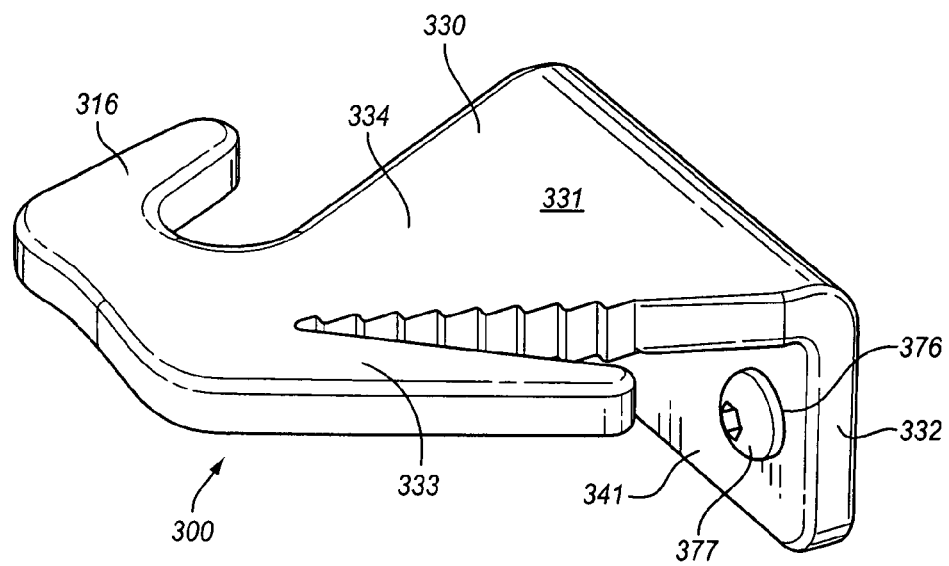
FIG. 10 shows an alternative embodiment of a tie-down and tensioning system according to the invention incorporating a flange attachment device.

FIG. 10 is a perspective view of another embodiment of a tie-down and tensioning system 300 according to the invention. System 300 includes a device body 334, a cord block 316, and a cord gripper 333 similar to those parts in the foregoing embodiments. In this embodiment, attachment member 341 comprises a flange 332 which preferably extends in a direction perpendicular to the longer surface 331 of device body 334. Openings 376 are formed in flange 332, through which openings pass fasteners 377, preferably screws, for attaching tie-down and tensioning device 330 to a support, such as a wall, a frame, or a post.

Figure 11:
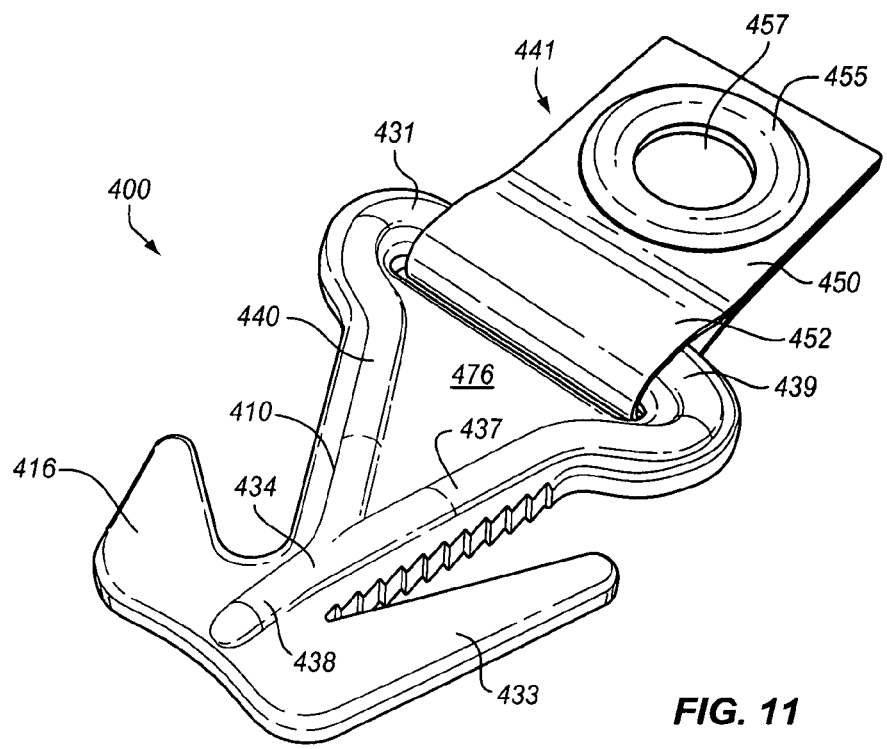
FIG. 11 shows an alternative embodiment of a tie-down and tensioning system according to the invention incorporating a grommet integrated into the system.

FIG. 11 is a perspective view of another embodiment of a tie-down and tensioning system 400 according to the invention. System 400 includes a tie-down and tensioning device 410 having an attachment member 441, a device body 434, a cord block 416, and a cord gripper 433 as in the foregoing embodiments. In this embodiment, attachment member 441 comprises a bracket 431, a fabric connector 450, and a grommet 455. Bracket 431 preferably is triangular and has an opening 476 and an arm 439. Arm 439, as well as the sides such as 437 of bracket 431, are rounded, and a rounded rib 440 is formed on the upper and lower surfaces to minimize wear on fabric 450. Rounded rib 440 is extended into device body 434 to form a strengthening rib 438. Fabric connector 450 preferably is a flexible material folded to form a sleeve 452 about arm 439. Grommet 455, having a grommet hole 457, is crimped onto fabric 450 to hold the fabric together. The fabric may also be sewn. Fabric 450 may be canvas, cloth webbing made of a material such as nylon or polyester, or other suitable material. In FIG. 11, fabric 450 is shown as a fabric tab, but it may also be a portion of a tent, a tarpaulin, or other material to which grommets are conventionally attached. Further, grommet 455 may be attached to material other than fabric. For example, grommet 455 may be crimped onto or otherwise attached to a plastic or metal sheet.

Figure 12:
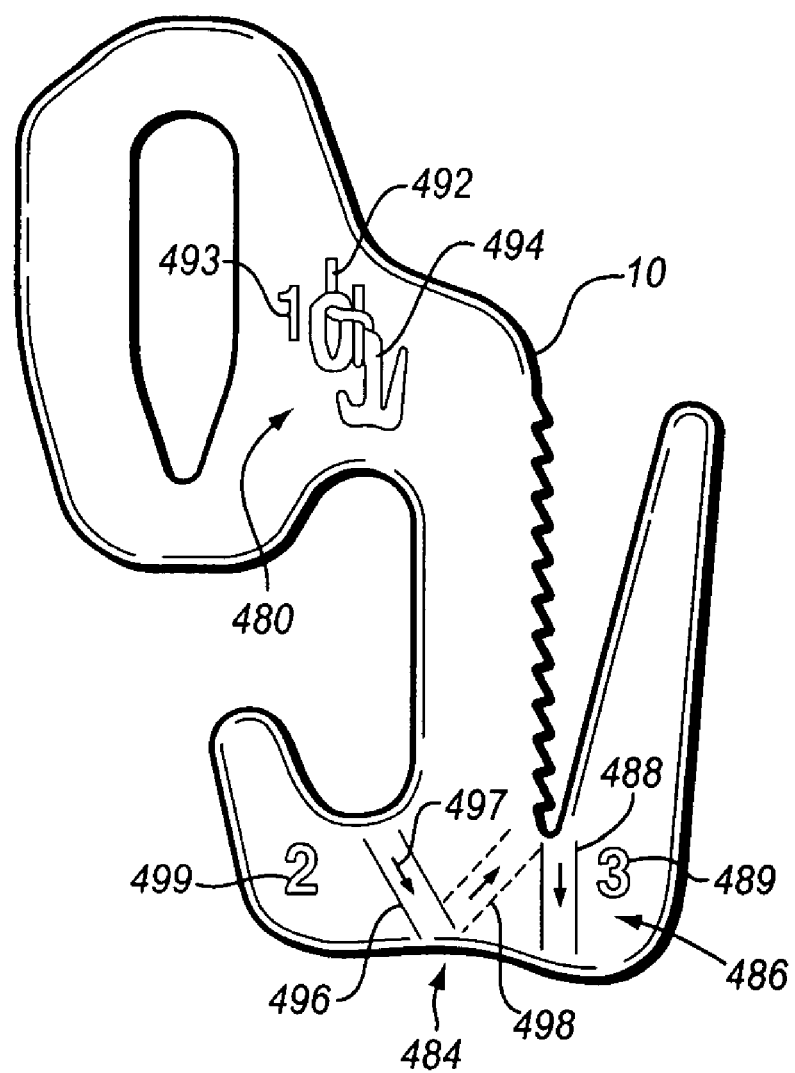
FIG. 12 illustrates the manner in which directions for using the device of FIG. 2 can be incorporated into the device.

FIG. 12 illustrates how descriptions 480, 484, and 486 of how to use the tie-down and tensioning system of the invention are placed directionally on the tie-down and tensioning device. This is illustrated with tie-down and tensioning device 10 of FIGS. 1-4. Description 480 is provided in the form of an illustration which includes a likeness 494 of the device and a likeness of a cord 492, showing how the cord may be connected to the device. Number "1" shown at 493 indicates that preferably this is the first process performed in the suggested method of using device 10. Descriptions 484 and 486 are in the form of arrows on likenesses 496, 498, and 488 of the cord. Likeness 498 of the cord is in ghost to indicate that the cord passes along the reverse side from the side on which description 484 is applied. Numbers "2" and "3" indicate the suggested order of processes 484 and 486. Descriptions 480, 484, and 486 may be etched into or printed or stamped onto device 10.

Figure 13:
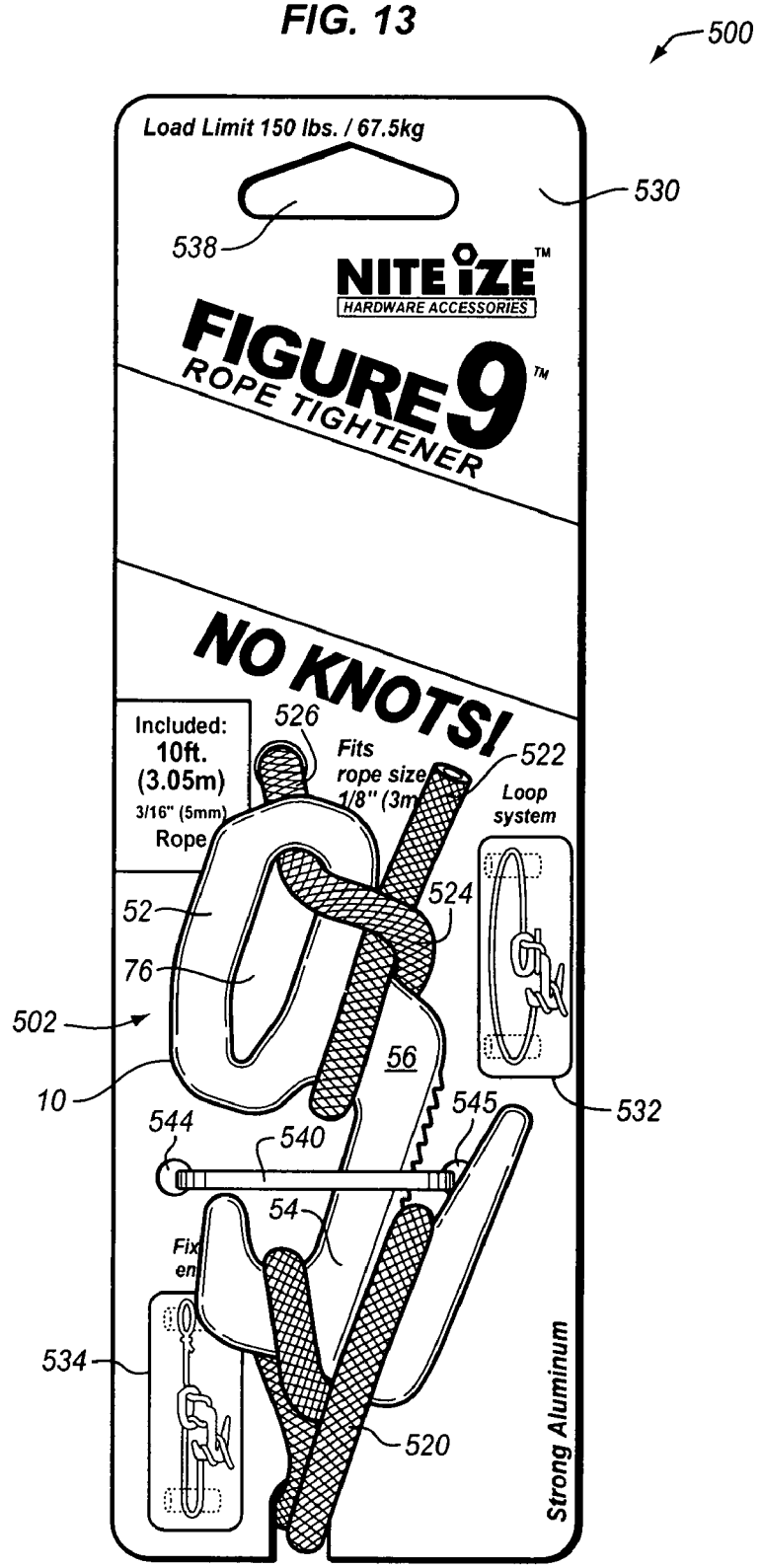
FIG. 13 illustrates an alternative method of using the tie-down and tensioning system according to the invention and a packaging apparatus and method for the system.
Figure 14:
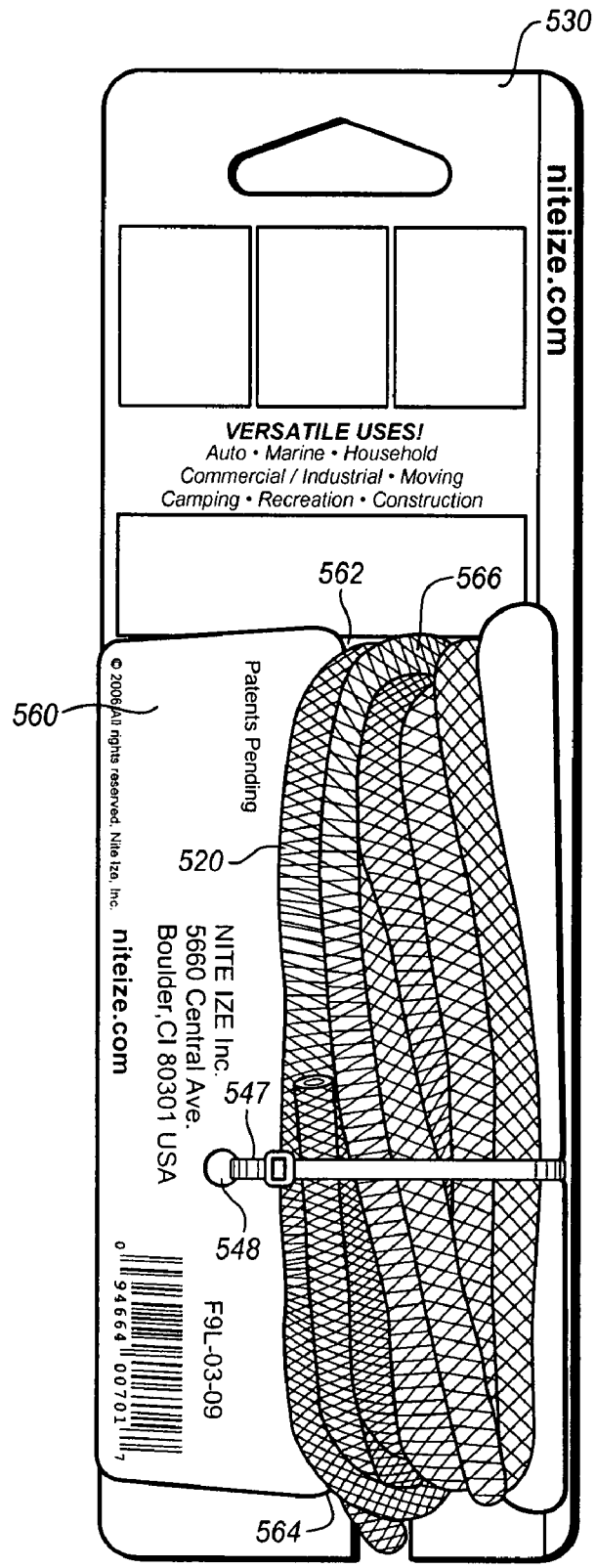
FIG. 14 shows the reverse side of the packaging apparatus of FIG. 13.

FIGS. 13 and 14 show a packaging system 500 for selling a system 502 according to the invention and illustrates how the packaging system according to the invention explains the use of system 502. FIG. 13 shows the front of packaging system 500 and FIG. 14 shows the back System 502 in this embodiment includes a tie-down and tensioning device 10 as described in reference to FIGS. 1-4, and a cord 520, although in this embodiment the cord is attached to attachment member 52 in a different manner than the manner described with reference to FIG. 1. In this embodiment, cord 522 passes around neck 56 forming a loop 524, crosses over cord portion 522, and then through opening 76 of attachment member 52, with both cord portions 522 and 526 running in essentially the same direction. Cord 524 can again be looped around neck 56 without untying the ends of the cord by forming loop 524 with a half twist, passing it through opening 76, and slipping it around device body 54 prior to securing rope 520 to second body portion 526. Packaging system 500 includes a card 530 having descriptions 532 and 534 showing use of the system and a hanger aperture 538. Device 10 is attached to card 530 by strap 540 which passes through holes 544 and 545 in card 530. Strap 540 preferably is a plastic strap or other flexible material. Turning to FIG. 14, cord 520 is wound around a flap 560 of card 530, or alternatively another card, which flap 560 or other card is attached to card 530 via strap 547, which may be the same as strap 540. Flap or card 560 includes notches 562 and 564 which prevents the windings 566 of cord 520 from sliding off of flap or card 560. A feature of packaging system 500 is that it presents tie-down and tensioning system 502 in an assembled manner that makes it easy for the customer to see how it is used. Similarly, device 10 may be packaged with cord 20 attached to device 10 in the manner shown in FIG. 1, or with the cord pre-attached in any useful manner.

Although the embodiments of the tensioning system are shown as discrete parts, it will be apparent that the tensioning system may be incorporated into other systems or pieces of equipment.

The embodiments described above and shown herein are illustrative and not restrictive. The scope of the invention is indicated by the claims rather than by the foregoing description and attached drawings. The invention may be embodied in other specific forms without departing from the spirit of the invention. Accordingly, these and any other changes which come within the scope of the claims are intended to be embraced therein.

What is claimed as new and desired to be protected by Letters Patent of the United States is:

1. A tie-down and tensioning system comprising a tie-down and tensioning device comprising:
    a device body;
    an attachment member connected to said device body, said attachment member including an attachment opening;
    a cord block comprising a cord block hook connected to said device body and a cord support surface disposed between said cord block hook and said device body; and
    a cord gripper attached to said device body, said cord gripper comprising a cord gripper hook connected to said device body, an interior surface of said cord gripper hook and the surface of said device body opposing said interior surface of said cord gripper hook defining a wedge-shaped opening, and a cord gripping surface formed on one of said interior surface of said cord gripper hook and said opposing surface of said device body, wherein said attachment member opening comprises an elongated slot, said slot being substantially in a direction parallel to the direction of said cord gripping surface, and wherein the end of said slot nearest said cord block is substantially wedge shaped.

2. The system of claim 1 wherein said attachment member includes a carabiner having a carabiner body, a carabiner slot, and a carabiner gate for closing said slot.

3. The system of claim 2 wherein said carabiner gate comprises a spring clip.

4. The system of claim 2 wherein said carabiner gate comprises a twist screw gate.

5. The system of claim 1 wherein said attachment member comprises a grommet.

6. The system of claim 5 wherein said attachment member further comprises a fabric connector with said grommet attached to said fabric connector.

7. The system of claim 6 wherein said attachment member further comprises a bracket having a bracket arm, and said fabric connector is connected to said bracket arm.

8. The system of claim 1 wherein said attachment member comprises a flange, and said opening comprises a fastener hole in said flange.

9. The system of claim 1 wherein said attachment member comprises a cord.

10. The system of claim 9 wherein said attachment member further comprises a cord attachment member, at least a portion of which is integrally formed with said device body.

11. The system of claim 10 wherein said cord attachment member includes a cord receptacle cover covering said cord receptacle.

12. The system of claim 10, and further including a pin connected to said device body and passing through said cord.

13. The system of claim 9, and further including glue attaching said receptacle to said cord.

14. The system of claim 1, and further including a cord packaged with said tie-down and tensioning device, said cord connected to said device in a manner in which it is to be used.

* * * * *